US006765847B2

(12) United States Patent
Birukawa et al.

(10) Patent No.: US 6,765,847 B2
(45) Date of Patent: Jul. 20, 2004

(54) OPTICAL DISK AND METHOD OF MAGNETICALLY SEPARATING TRACKS OF THE OPTICAL DISK (75) Inventors: Masahiro Birukawa, Hirakata (JP); Yasumori Hino, Ikoma (JP); Yasushi Hozumi, Ageo (JP); Tomoyuki Hiroki, Zama (JP)

(73) Assignees: Matsushita Electric Industrial Co., Ltd., Osaka (JP); Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/125,742

(22) Filed: Apr. 18, 2002

(65) Prior Publication Data
US 2002/0154579 A1 Oct. 24, 2002

(30) Foreign Application Priority Data
Apr. 19, 2001 (JP) ........................................ 2001-120685

(51) Int. Cl.[7] .......................... G11B 11/00; G11B 5/66
(52) U.S. Cl. ................ 369/13.47; 369/13.07; 369/275.4; 428/64.3
(58) Field of Search ...................... 369/13.47, 13.42, 369/13.02, 13.05, 13.06, 275.1, 288, 283, 275.3, 13.54, 275.4, 13.27, 13.07, 13.08; 428/332, 336, 694 EC, 694 ML, 694 MM, 64.3, 694 MT (56) References Cited

U.S. PATENT DOCUMENTS 5,936,915 A    8/1999  Fujii et al. ............... 369/13.42
5,966,348 A   10/1999  Hashimoto et al.
5,995,472 A   11/1999  Fujii et al. ............... 369/13.05
6,027,825 A    2/2000  Shiratori et al.
6,147,939 A   11/2000  Takahashi et al.
6,249,489 B1 *  6/2001  Fujii et al. ............... 369/13.54
6,265,062 B1 *  7/2001  Shiratori ..................... 428/332
6,399,174 B1    6/2002  Shiratori et al. ........... 428/64.3
6,403,148 B1 *  6/2002  Shiratori et al. ............ 427/128

FOREIGN PATENT DOCUMENTS

| JP | 6-290496   | 10/1994 |
| JP | 8-147777   | 6/1996  |
| JP | 10-91938   | 4/1998  |
| JP | 10-340493  | 12/1998 |
| JP | 11-126381  | 5/1999  |
| JP | 11-126386  | 5/1999  |
| JP | 11-134730  | 5/1999  |
| JP | 11-213375  | 8/1999  |

* cited by examiner

Primary Examiner—Ali Neyzari
(74) Attorney, Agent, or Firm—Merchant & Gould P.C.

(57) ABSTRACT

On a disk-shaped substrate with pits and grooves, a first dielectric layer, a magnetic layer, and a second dielectric layer are formed. A data region used for recording/reproduction includes a plurality of tracks, and is divided into a plurality of segments. Each segment includes a pit region and a groove region. Recording/reproducing tracks are composed of the grooves. Magnetic anisotropy of a magnetic layer positioned on each of lands between the respective recording/reproducing tracks is reduced to a level lower than that of magnetic anisotropy of the magnetic layers positioned on the grooves, so that the recording/reproducing tracks are magnetically separated. On an inner side of an innermost recording/reproducing track and on an outer side of an outermost recording/reproducing track, at least one dummy track is provided, respectively.

18 Claims, 6 Drawing Sheets

OPTICAL DISK AND METHOD OF MAGNETICALLY SEPARATING TRACKS OF THE OPTICAL DISK

BACKGROUND OF THE INVENTION

1. Field of the Invention

The present invention relates to an optical disk that is used for information recording or reproduction and further to a method of magnetically separating tracks of the optical disk.

2. Related Background Art

It has been desired in the area of optical disks to achieve higher-density information recording. A method for realizing such high-density recording has been proposed in the form of a DWDD (domain wall displacement detection) type optical disk.

In the DWDD type optical disk, it is necessary to weaken magnetic coupling between adjacent recording/reproducing tracks. Therefore, when manufacturing the DWDD type optical disk, prior to recording of information signals, a magnetically separating process for magnetically separating adjacent recording/reproducing tracks is performed. The magnetically separating process is performed by methods such as those disclosed in JP 6(1994)-290496 A and JP10 (1998)-340493 A.

Figure 7:
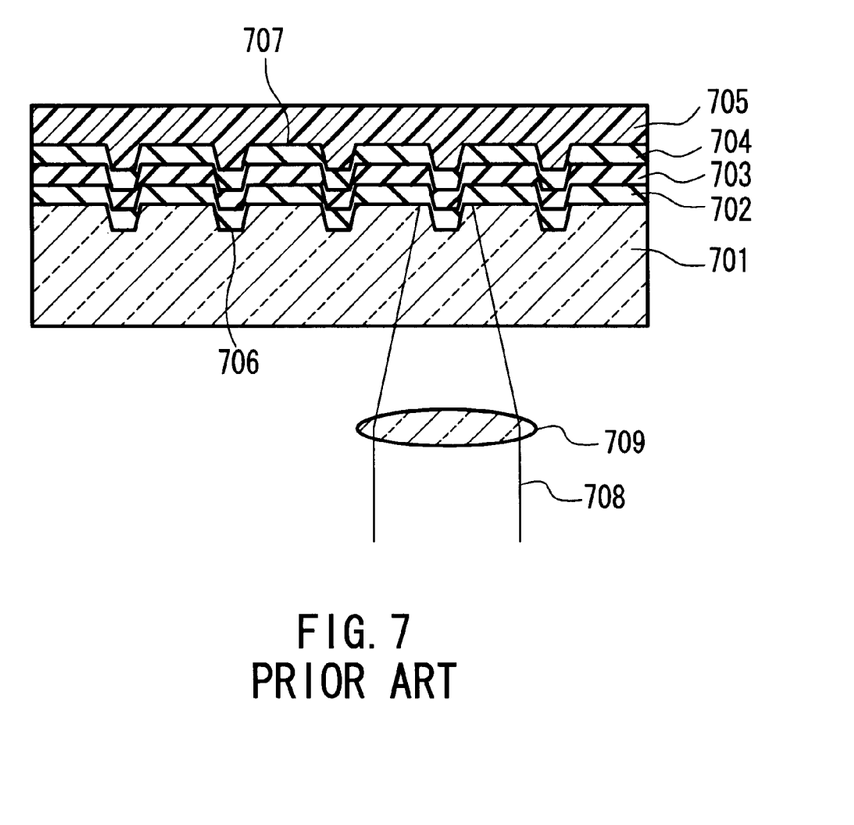
FIG. 7 is a cross sectional view showing a configuration of a conventional optical disk and an operation performed in a magnetically separating process according to a conventional technique.

A structure of the DWDD type optical disk and a method of magnetically separating process according to a conventional technique are described as examples with reference to FIG. 7. In an optical disk shown in FIG. 7, a first dielectric layer 702, a magnetic layer 703, a second dielectric layer 704, and a protective coating layer 705 are laminated in this order on a substrate 701. On a surface of the substrate 701 on a side of the thin film layers, grooves 706 are formed. A portion between two of the grooves 706 adjacent to each other in a radial direction is referred to as a land 707 that is used as a recording/reproducing track. The grooves 706 have a width of, for example, 0.2 $\mu$m, and the lands 707 have a width of 1.4 $\mu$m. The magnetic layer 703 includes at least three magnetic thin films that are used for reproduction employing a DWDD system. In order for the DWDD system to be performed, it is necessary to magnetically separate the lands 707 as the tracks used for recording/reproduction.

The following description is directed to a method of performing the magnetically separating process with respect to this optical disk. In the magnetically separating process, a laser beam 708 to be used for annealing is focused on the groove 706 by an objective lens 709 and allowed to scan along the grooves 706, so that magnetic coupling between the magnetic layers 703 on the grooves 706 is lost. As a result, in each of the lands 707, which is a region interposed between the grooves 706 that have been subjected to annealing, both sides of the land 707 is magnetically separated, thereby allowing a DWDD operation to be performed. The laser beam 708 used in this process has, for example, a laser power of 2 mW and a wavelength λ of 780 nm. The objective lens 709 has a NA of 0.5, and a beam spot of about 800 nm in diameter is formed. The beam spot of the laser beam 708 travels at a speed of, for example, 2 m/second.

When the lands 707 interposed between the grooves 706 are used as the recording/reproducing tracks as in the foregoing description, at an innermost or outermost end of a recording/reproducing track region, the groove 706 is provided. That is, even the land 707 positioned at the innermost or outermost end is interposed between the grooves 706. Accordingly, both sides of each of all land tracks can be magnetically separated by allowing the laser beam 708 for annealing to scan over all the grooves 706.

When manufacturing a disk provided with grooves, generally, portions exposed to a laser beam during master disk cutting correspond to the grooves of the disk. In the master disk cutting, due to a limit in the degree to which a laser beam is converged, it is difficult to manufacture grooves of a width as narrow as 0.1 to 0.2 $\mu$m. When a laser having a wavelength of 351 nm and an objective lens having a NA of 0.9 are used as in conventional cutting, an obtained groove width is inevitably not less than 0.3 $\mu$m. However, as a region for magnetically separating tracks so as to enable the DWDD operation, it is sufficient to have a width of about not less than 0.02 $\mu$m, which corresponds to a width of a domain wall.

In order for an excellent DWDD operation to be performed, a domain wall driving force is required to be greater than a domain wall displacement inhibiting force, and thus a recording/reproducing track is required to have a width of 0.3 to 0.6 $\mu$m. Accordingly, when lands are used as the recording/reproducing tracks, a track pitch is inevitably not less than 0.6 $\mu$m.

Alternatively, the grooves may be used as the recording/reproducing tracks, with the lands being subjected to the magnetically separating process. In this case, the lands can be reduced in width to 0.1 to 0.2 $\mu$m while maintaining the width of the grooves of 0.3 to 0.5 $\mu$m, which is advantageous from a processing standpoint.

When the grooves are used as the recording/reproducing tracks, annealing is performed by allowing a light beam to scan over the lands, so that groove tracks are magnetically separated. In this case, it is possible to allow the light beam to scan over the lands of a narrower width by operating tracking servo using 1st-order diffracted light diffracted from the lands. However, on an innermost track and an outermost track in a recording/reproducing track region, the following problem arises.

In a conventional technique in which the lands are used for recording, since the groove always is formed on an inner side of an innermost recording/reproducing track, annealing is performed by tracking on the groove, so that the magnetically separating process can be performed with respect to both sides of an innermost land track.

On the other hand, when the grooves are used for recording, there is difficulty in performing the magnetically separating process as follows. As for an innermost groove track, for example, on an outer side of the groove track, the land is formed; however, on an inner side of the groove track, a flat surface spreads, on which no land region of a narrower width is formed. Therefore, while the magnetically separating process can be performed with respect to the land on the outer side of the innermost groove track, the magnetically separating process hardly can be performed on the inner side of the groove track, because tracking servo cannot be operated on the same side. The same applies to an outermost groove track. While the magnetically separating process can be performed with respect to an inner side of the outermost groove track, it hardly can be performed with respect to an outer side of the groove track.

SUMMARY OF THE INVENTION

In order to solve the aforementioned problem, it is an object of the present invention to provide an optical disk that achieves high-density recording and allows an excellent DWDD (domain wall displacement detection) operation to be realized by performing a magnetically separating process with respect to both sides of each of all recording/reproducing tracks provided in a region extending from an innermost track to an outermost track, and a method of performing the magnetically separating process with respect to the optical disk.

An optical disk of the present invention has a basic configuration including a disk-shaped substrate with pits and grooves formed by emboss processing, and at least a first dielectric layer, a magnetic layer, and a second dielectric layer that are formed on the substrate. In the substrate, a predetermined region ranging in a radial direction is used as a data region for recording/reproducing data. The data region includes a plurality of recording/reproducing tracks ranging from an innermost track to an outermost track, and is divided into a plurality of segments in a tangential direction. Each segment includes a pit region and a groove region. The pit region is provided with at least a pair of wobble pits to be used for sample servo. The groove region is provided with the recording/reproducing track. The recording/reproducing tracks are composed of the grooves. The magnetic anisotropy of the magnetic layer positioned on each of lands between the respective recording/reproducing tracks is reduced to a level lower than that of the magnetic anisotropy of the magnetic layers positioned on the grooves, so that the recording/reproducing tracks are magnetically separated. The aforementioned is common to optical disks of the present invention as the basic configuration.

An optical disk of a first configuration according to the present invention has, in addition to the aforementioned basic configuration, a feature that at least one inner dummy track that is not used for data recording/reproduction is provided on the inner side of the innermost recording/reproducing track, and at least one outer dummy track that is not used for data recording/reproduction is provided on the outer side of the outermost recording/reproducing track.

According to this configuration, the following advantage can be achieved. That is, since the recording/reproducing tracks are composed of the grooves, a narrower track pitch can be realized while a sufficient width of the grooves is maintained. Further, since the inner dummy track is provided, the land of a narrower width also can be formed on the inner side of the innermost recording/reproducing track. Thereby, on the lands on both sides of the innermost recording/reproducing track, tracking servo of a light beam to be used for the magnetically separating process can be operated by using a conventional push-pull detection method. Thus, both sides of the innermost recording/reproducing track also can be magnetically separated. The same applies to the outermost recording/reproducing track.

For the realization of high-density recording, it is advantageous to form magnetically separating regions so as to have the narrowest possible width. For the formation of the magnetically separating regions having the narrowest possible width, it is effective to form a light beam spot to be used for the magnetically separating process so as to have the smallest possible diameter. Therefore, it is desirable to use a short wavelength laser such as a blue laser, a high NA objective lens, or the like. Particularly, when the high NA objective lens is used, because of a short working distance of the lens, it is advantageous to irradiate the light beam to be used for the magnetically separating process onto the land from a film surface side rather than via the substrate. This achieves an improvement in energy efficiency and allows high-speed processing.

An optical disk of a second configuration according to the present invention has, in addition to the aforementioned basic configuration, a feature that the magnetic anisotropy of the magnetic layers positioned on a land portion on the inner side of the innermost recording/reproducing track and a land portion on the outer side of the outermost recording/reproducing track, respectively, is reduced to a level lower than that of the magnetic anisotropy of the magnetic layers positioned on the recording/reproducing tracks. Thus, the magnetic separation is achieved on the inner side of the innermost track and the outer side of the outermost track.

An optical disk of a third configuration according to the present invention has, in addition to the aforementioned basic configuration, a feature that also in the pit region, the magnetic anisotropy of the magnetic layer positioned on an extension of the land is reduced to a level lower than that of the magnetic anisotropy of the magnetic layer positioned on an extension of the groove.

An optical disk of a fourth configuration according to the present invention has, in addition to the aforementioned basic configuration, a feature that the grooves are composed of a discontinuous series of grooves in the form of a spiral that is interrupted in the pit regions at an interval of not more than 7 $\mu$m.

According to this configuration, the magnetically separating process can be realized efficiently using a simple device, in which groove tracks are magnetically separated over the entire data region by allowing a light beam to scan over the lands of a narrower width. That is, according to this configuration of the grooves in the spiral form, the magnetically separating process can be completed, for example, in the following manner. On the land on an inner side of the innermost track in the data region, tracking servo is operated using a light beam to be used for the magnetically separating process by the conventional push-pull detection method. The tracking servo can be operated so that a magnetically separating operation is continued and completed beyond the outermost track in the data region. These operations can be performed as a series of operations without performing switching, a track jump, or track seeking during the operations. Thus, in the data region, the magnetic separation can be achieved on both sides of each of all the tracks ranging from the innermost track to the outermost track.

Each of the lands that are subjected to the magnetically separating process may be formed intermittently. However, it is required that the interval at which the land is interrupted be not more than 7 $\mu$m for the following reason. The maximum eccentricity of the disk or the maximum eccentricity of the disk with chucking errors or the like being considered is expected to be 70 $\mu$m. If the interval at which the land is interrupted is not more than 7 $\mu$m with respect to the above maximum eccentricity, less influence is exerted by each interruption of the land, thereby allowing a light beam to be lead smoothly back to a portion of the next succeeding land. According to this configuration, even in the case where the disk has the maximum eccentricity, an amount of off-tracking caused during each interruption of the land is 0.05 $\mu$m at most. Thus, even when the lands are formed intermittently, the tracking functions reliably, thereby allowing the magnetically separating process to be completed by performing the series of operations in a continuous manner throughout the process.

In any of the optical disks of the aforementioned configurations, the following is preferable. The magnetic layer includes at least a domain wall displacement layer, a switching layer, and a recording layer that are formed in this order. The switching layer has a Curie point lower than those of the domain wall displacement layer and the recording layer. In a region having a temperature higher than the Curie point of the switching layer, a domain wall transferred to the domain wall displacement layer shifts toward a high-temperature portion.

Furthermore, in any of the optical disks of the aforementioned configurations, preferably, a track pitch is not more than 0.6 μm.

A method of magnetically separating tracks of an optical disk according to the present invention is a method of magnetically separating the recording/reproducing tracks when any of the optical disks of the aforementioned configurations is provided. In the method, a light beam converged to a degree higher than that of a light beam to be used for recording/reproduction is allowed to scan over the lands that correspond to a portion between the recording/reproducing tracks, so that the magnetic anisotropy of the magnetic films positioned on the lands or both of the lands and the extensions of the lands is reduced to a level lower than that of the magnetic anisotropy of the magnetic films positioned on the grooves.

Using an optical disk subjected to the magnetically separating process as in the aforementioned configuration, a stable DWDD operation is realized. Further, when the optical disk has the configuration in which the magnetic anisotropy of the magnetic films positioned both on the lands and on the extensions of the lands is reduced to a level lower than that of the magnetic anisotropy of the magnetic films positioned on the grooves, the following effect can be achieved in addition to the effect of realizing the stable DWDD operation in each track. That is, a DWDD operation can be performed in flat portions in which the lands are interrupted. Thereby, when the DWDD operation does not work well in the groove tracks, it can be determined whether the inferiority is caused by a defect in a film configuration or a defect in the shapes of the lands and the grooves by comparing the DWDD operations performed in the groove tracks and the flat portions, respectively.

DETAILED DESCRIPTION OF THE INVENTION

Hereinafter, the present invention will be described by way of embodiments with reference to the appended drawings.
<Embodiment 1>

Figure 1:
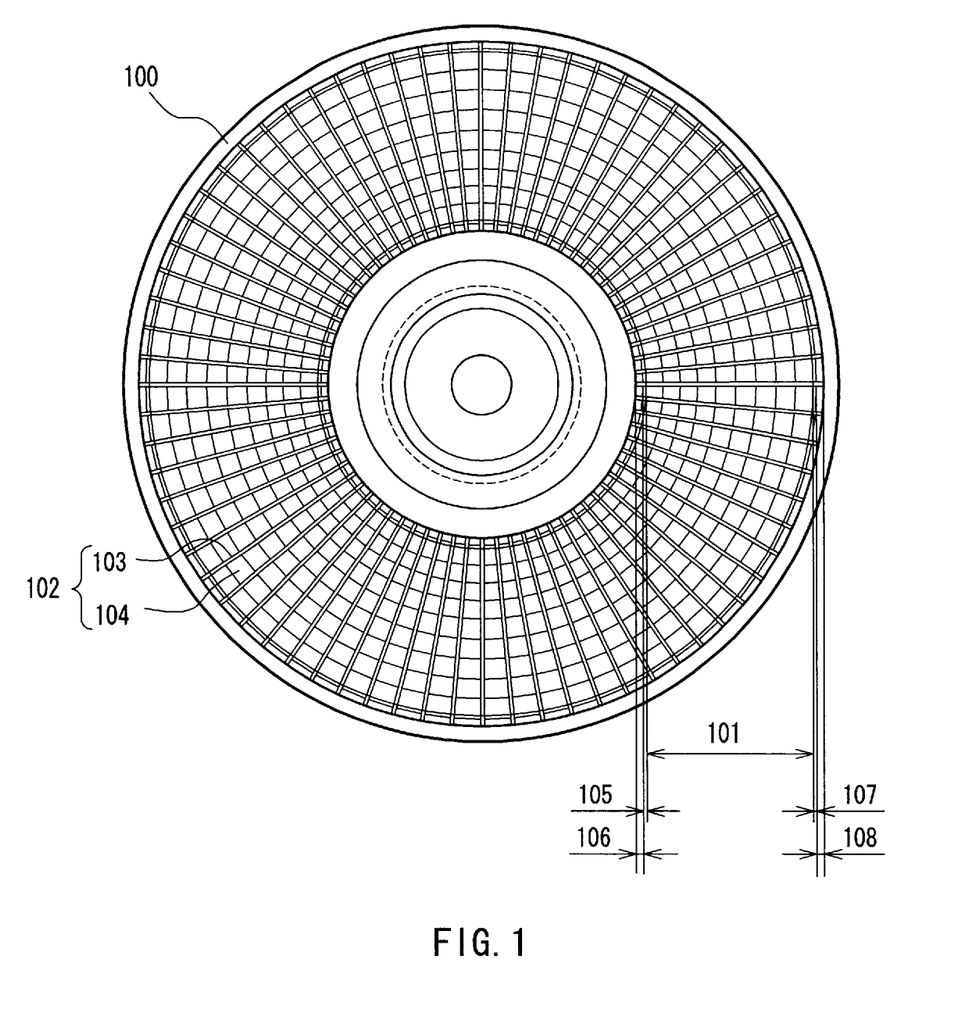
FIG. 1 is a plan view showing a configuration of an optical disk of an embodiment according to the present invention.

FIG. 1 is a plan view of an optical disk of an embodiment according to the present invention. This optical disk has, for example, a disk shape of 50.8 mm in outer diameter, in which a central hole having a diameter of 11 mm is provided. In a data region 101 constituting a main portion of the disk, an innermost track is positioned at a radius of 11.5 mm, and on an inner side of the innermost track, an inner dummy track 105 is provided. On an inner side of the inner dummy track 105, a lead-in region 106 is provided. The lead-in region 106 is a read-only region in which information in the form of pit rows is provided. On an outer side of an outermost track in the data region 101, an outer dummy track 107 is provided in the same manner as in an innermost area. On an outer side of the outer dummy track 107, a lead-out region 108 is provided.

The entire data region 101 is divided equally into 1,280 pieces of segments 102 in a tangential direction. Each of the segments 102 is composed of a pit region 103 in a leading position and a groove region 104 in a position following the leading position. The pit region 103 of the segment 102 has a length of about 5.5 μm in the tangential direction regardless of a radius at which the pit region 103 is positioned. The groove region 104 of the segment 102 has a length in the tangential direction that increases in a direction toward an outer track. Accordingly, the amount of data stored in each of the segments 102 increases in the direction toward the outer area. The data region 101 is divided into 26 zones in a radial direction, and an amount of data stored in the groove region 104 is different depending upon the zone.

Figure 2:
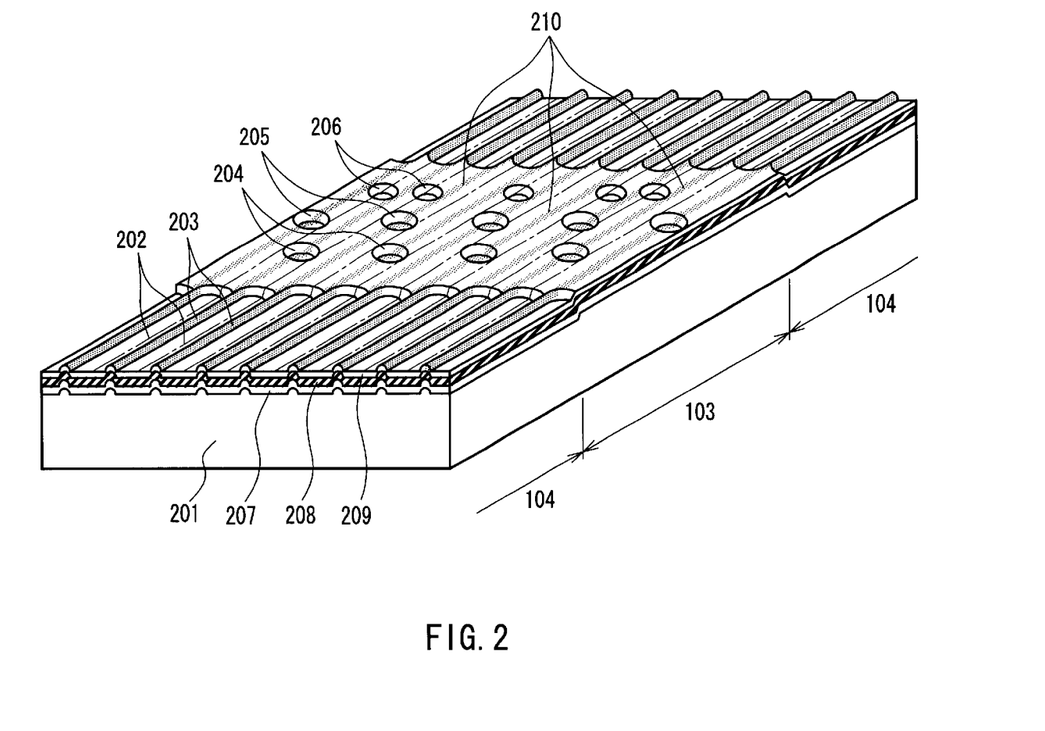
FIG. 2 is a partial expanded view in perspective of the optical disk shown in FIG. 1.
Figure 3:
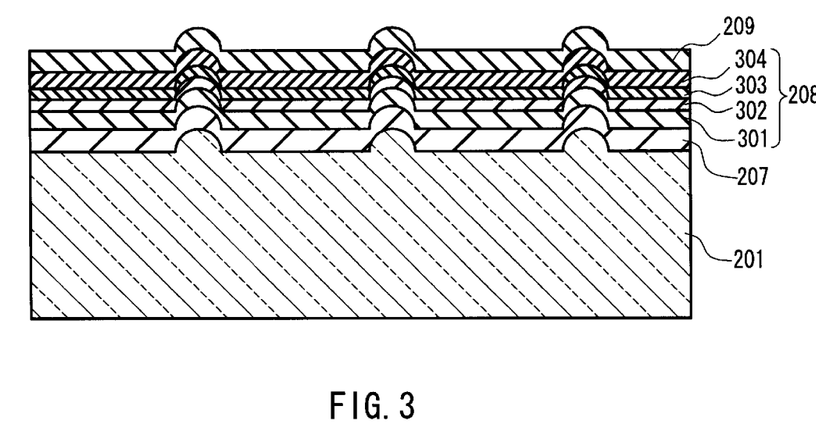
FIG. 3 is a partial expanded view in cross section of the optical disk shown in FIG. 1.

FIG. 2 shows the details of each border portion between the segments 102 in the data region 101 and shows in section a structure of the disk. In this embodiment, pits and grooves are formed by emboss processing on a polycarbonate substrate 201 of 0.6 mm thickness, and each segment composed of the pit region 103 in the leading position and the groove region 104 in the position following the leading position is formed in a repeated manner along the tangential direction. A first dielectric layer 207 of silicon nitride, a magnetic layer 208, and a second dielectric layer 209 of silicon nitride are deposited on the substrate 201. Although not shown in the figure, on the second dielectric layer 209, a protective layer, a lubricant layer, or the like is provided as required. As shown in FIG. 3, the magnetic layer 208 is composed of four layers of magnetic films that are a domain wall displacement layer 301, a control layer 302, a switching layer 303 and a recording layer 304. The respective configurations of these layers are the same as those disclosed in JP11(1999)-134730 A. These layers are configured so as to be adapted to a DWDD reproducing system.

The optical disk having the aforementioned configuration is manufactured by a method that follows the below-mentioned process steps in order.

1) A photo-resist coating is applied to a glass master disk of 6 mm thickness.
2) Cutting (exposure) is performed using a laser having a wavelength of 351 nm and an objective lens having a NA of 0.9.
3) Development is performed, and portions exposed in the previous step are removed.
4) A heat treatment is performed at a temperature of 150° C. for about 30 minutes.
5) On the glass master disk, a nickel film is formed by sputtering.
6) Plating is performed.
7) The film is stripped from the disk and the disk is used as a stamper.
8) By molding using the stamper thus manufactured as a mold, a polycarbonate substrate is manufactured.

9) A silicon nitride film, a domain wall displacement layer, a control layer, a switching layer, a recording layer, and a silicon nitride film are deposited in this order on the substrate.

10) A magnetically separating process is performed.

By the aforementioned process steps, the optical disk having the configuration shown in FIGS. 2 and 3 is manufactured.

In the following description, a structure of each border portion between the segments 102 in the data region 101 will be detailed by referring back to FIG. 2. In this embodiment, a first wobble pit 204, a second wobble pit 205, and an address pit 206 are provided in each of the pit regions 103. The first wobble pit 204 and the second wobble pit 205 are used for obtaining a tracking-error signal to be used for sample servo and provided so as to correspond to both groove tracks adjacent to these pits, respectively. Accordingly, the first wobble pit 204 and the second wobble pit 205 are present in all the segments. On the other hand, the address pit 206 is present in some segments and is absent in other segments. One sector is composed of 80 segments arranged continuously in the tangential direction, and an address represented by a track number and a sector number is defined by using combinations of the presence or absence of the address pit 206 in 80 positions corresponding to the address pits 206 in each sector.

In recording/reproduction, clock extraction is carried out in such a manner that a position of a wobble pit or a groove edge is detected to be synchronized with a clock. Therefore, the need for particularly providing a clock pit is eliminated. According to this configuration, that is, only a pair of the wobble pits 204 and 205 and one address pit 206 are provided in the pit region 103 in each segment, the pit regions 103 are allowed to have a length in the tangential direction, namely, an interval at which lands 203 are interrupted, of about 5.5 μm over the entire region of the disk.

Figure 4:
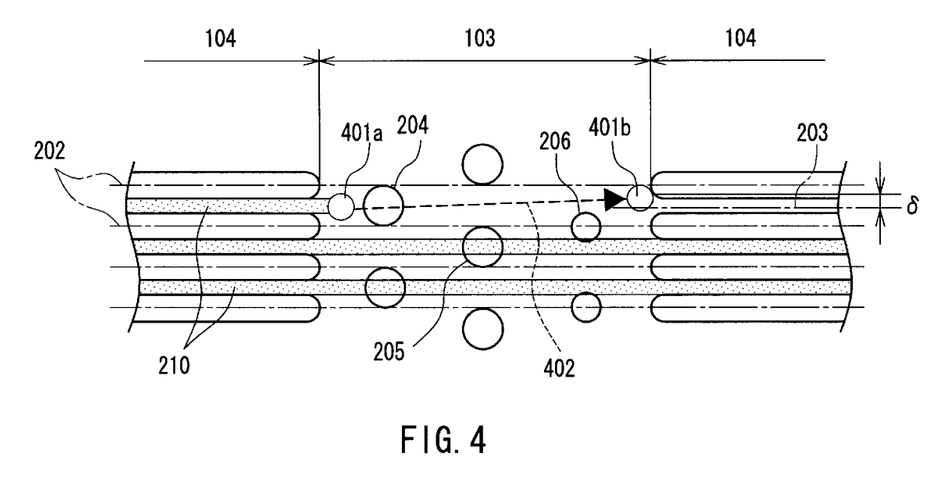
FIG. 4 is a partial expanded plan view of the optical disk shown in FIG. 1 for showing an operation performed in a magnetically separating process.

In the following description, an effect that can be provided when the pit regions have a length of about 5.5 μm will be detailed with reference to FIG. 4. In the present invention, as will be described later, grooves 202 are used as tracks for data recording/reproduction. Therefore, when the magnetic separation is performed, a beam spot is allowed to scan over the lands 203 each formed between the grooves 202. As means for performing magnetic separation, a laser having a wavelength of 405 nm and an objective lens having a NA of 0.85 are used and a laser beam is focused on the optical disk so as to make a beam spot 401 to be used for a magnetically separating process. Beam spots 401a and 401b show a state in which the same beam spots 401 are located at different positions, respectively. The spot 401 has a diameter (half width) of 0.28 μm. A knife edge method and a push-pull method (both are known techniques) are used for focus error detection and tracking error detection, respectively. The spot 401 is allowed to scan over the lands 203, each formed in a portion between the grooves 202.

In this scanning, the beam spot 401a that has entered the pit region 103 from the groove region 104 on a left side in the figure passes over a trajectory 402 on an extension of the land 203 by inertia. In the push-pull method, as is always the case, the objective lens is driven as follows. If an off-tracking of even the slightest degree is caused when the beam spot 401 passes over the first wobble pit 204, the beam spot 401 is caused to deviate either to the left or to the right. Then, when the beam spot 401 passes over the second wobble pit 205, the beam spot 401 is lead back on the extension of the land 203. However, an amount of driving the objective lens falls within such a range as to exert no substantial influence.

The most substantial influence is exerted on off-tracking when the beam spot 401 passes over the address pit 206. As described above, the address pit 206 is present in some segments and is absent in other segments. When the beam spot 401 is allowed to scan along the extensions of the lands 203, as shown in FIG. 4, there is necessarily a situation in which an address pit is present only on one side. In this case, the beam spot 401 is caused to deviate to a great degree due to the presence of the address pit 206, and thus off-tracking is caused. Therefore, at a point in time when the beam spot 401 enters the groove area 104 again (at a position of the beam spot 401b), the amount of off-tracking becomes great, and thus a tracking operation no longer can work well. However, by setting the pit regions 103 to have a length of about 5.5 μm as in this embodiment, a stable tracking operation always can be performed without employing a particular operation such as switching of tracking servo so as to repeat turning on and off in each segment. That is, since the interval at which the land 203 is interrupted is small, less influence is exerted by each interruption of the land, thereby allowing the beam spot 401 to be lead smoothly back to the next land 203. As a result, even in the case where the disk has the maximum eccentricity, the amount of the off-tracking caused during interruptions of the land 203 is suppressed to such a degree that is permissible from a practical viewpoint. Therefore, even if lands are formed intermittently, the tracking functions without fail.

In this embodiment, when the lands 203 (or the grooves 202) are traced in the tangential direction, all the lands 203 (or the grooves 202) are continuous in a spiral form while being interrupted at the interval of about 5.5 μm in the pit regions 103. Accordingly, simply by rotating the disk with focus servo and tracking servo operating from the inner track to the outer track, or from the outer track to the inner track, the magnetically separating process can be completed with respect to the entire data region without performing a particular operation in the course of the process.

In the following description, this embodiment will be explained in greater detail by referring back to FIG. 2. In FIG. 2, the grooves 202 are used as tracks for data recording/reproduction. A distance between the center lines of two adjacent grooves 202, namely the track pitch, is 0.54 μm. The grooves 202 have a 0.44 μm width of half maximum and the lands 203 have a 0.1 μm width of half maximum. Further, the grooves have a depth of 30 to 60 nm, and each slope of the grooves has an inclination angle of 50 to 55 degrees. In a process of manufacturing a stamper used for subjecting the substrate 201 to the emboss processing, a photo-resist coating is applied to a raw disk to be a master, and portions corresponding to the grooves 202 are exposed to a laser beam. In the exposure, a laser having a wavelength of 351 nm and an objective lens having a NA of 0.9 are used, and a beam spot of about 0.23 μm in diameter is formed. In the case of forming the grooves 202 having a width narrower than that, a particular exposure system such as an electron beam exposure system is required. However, by using the grooves 202 with a wider width and the lands 203 with a narrower width as in this embodiment, it is made possible to obtain a track pitch as narrow as 0.54 μm without using such a system. The optical disk used in this embodiment is adapted to an operation in which a semiconductor laser having a wavelength of 650 nm and an objective lens having a NA of 0.6 are used and recording/reproduction is performed by allowing a beam spot that has passed through the substrate 201 to scan over the grooves 202.

Furthermore, as shown in FIG. 2, the lands 203 and portions positioned on the extensions of the lands 203 in the pit regions 103 are subjected to the magnetically separating process, so that magnetically separating regions 210 are formed as continuous regions. The magnetically separating regions 210 are formed by using a laser having a wavelength of 405 nm and an objective lens having a NA of 0.85 and allowing a converged beam spot to scan along the lands 203. A power needed therefore is, for example, about 7 mW at a linear velocity of 6 m/second. In each of the magnetically separating regions 210 formed in this manner, the perpendicular anisotropy constant of the magnetic film is reduced, so that under the influence of a demagnetizing field, an easy magnetization axis is changed from a perpendicular direction to an in plane direction with respect to a film surface. As a result, the magnetic film is brought to a state of being magnetically separated at the magnetically separating regions 210, and thus a magnetic domain boundary (domain wall) in the perpendicular magnetic film cannot exist. As disclosed in JP11(1999)-213375 A, this process of magnetic separation is important in performing the DWDD operation.

As described above, the example shown in this embodiment employed the configuration in which magnetic anisotropy of both the magnetic films on the lands 203 and the magnetic films positioned on the extensions of the lands 203 in the pit regions 103 were reduced to a level lower than that of magnetic anisotropy of the magnetic films positioned on the grooves 202. According to this configuration, in each track, the DWDD operation can be performed not only in the groove tracks interposed between the lands 203 that have been subjected to the magnetically separating process, but also in the flat portions in which the lands 203 are interrupted. By utilizing this configuration, when the DWDD operation does not work well in the groove tracks, it can be determined promptly whether the cause thereof is a defect in a film configuration or a defect in the shapes of the lands 203 or the grooves 202 by comparing the DWDD operations performed in the groove tracks and the flat portions, respectively. As a result, when a defect occurs during manufacturing, the cause of the defect can be found promptly, thereby enabling smooth correction of the defect.

Figure 5:
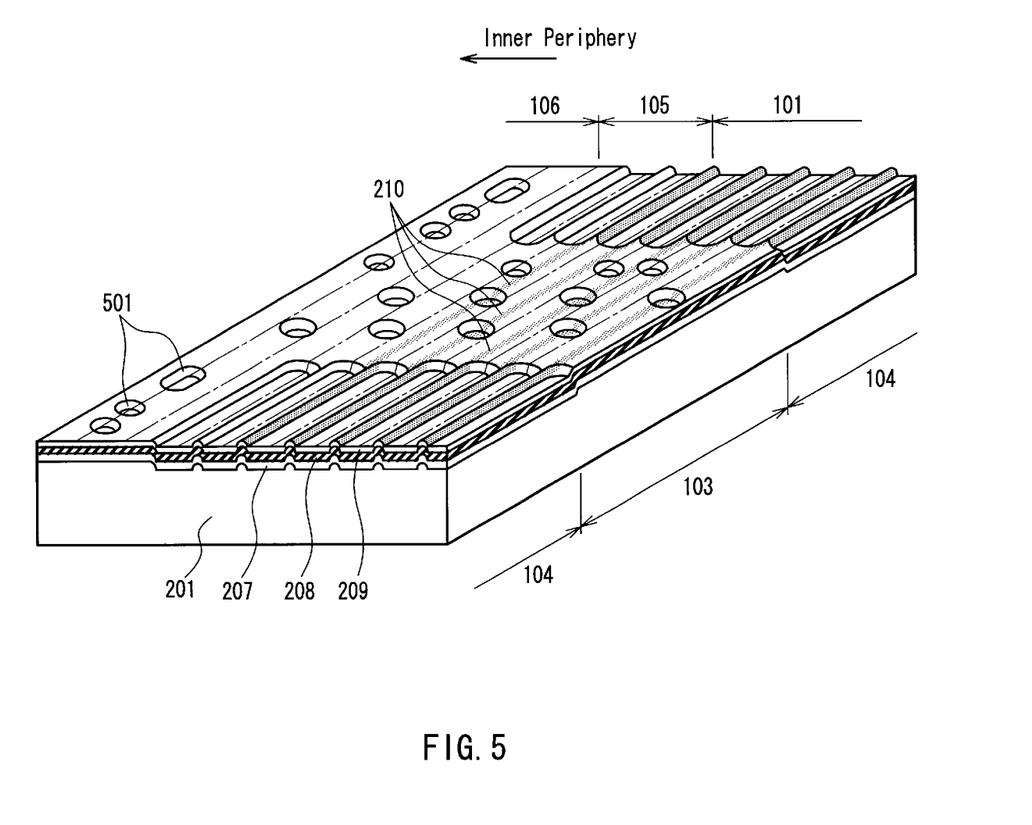
FIG. 5 is a partial perspective view of an inner portion in a recording region of the optical disk shown in FIG. 1.
Figure 6:
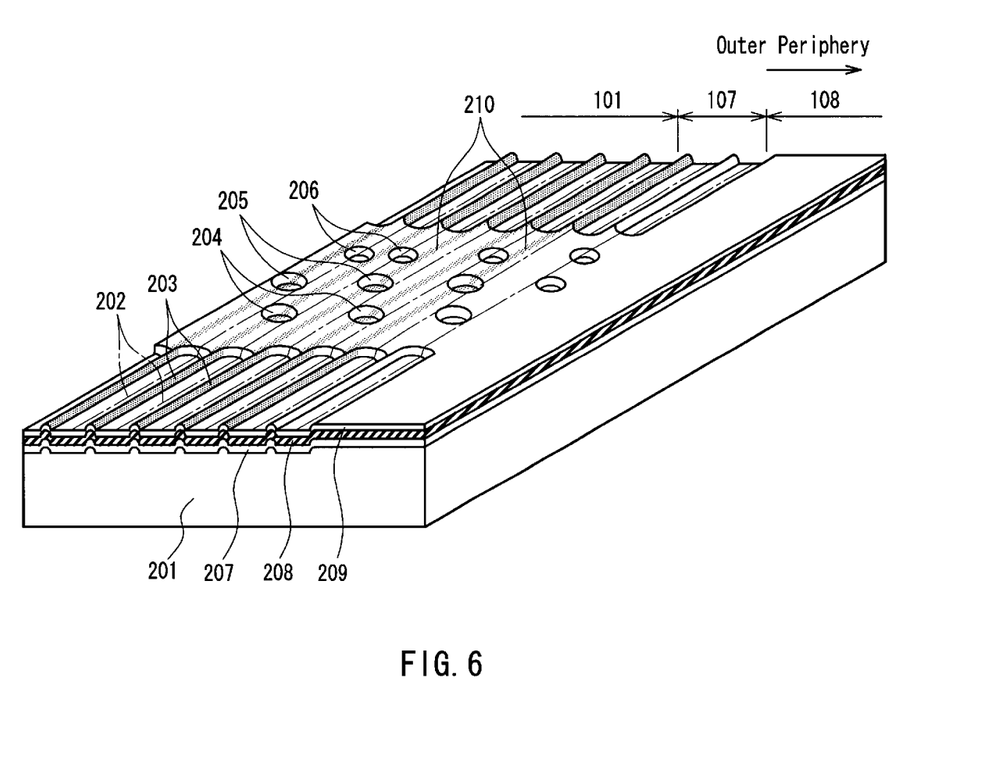
FIG. 6 is a partial perspective view of an outer portion in the recording region of the optical disk shown in FIG. 1.

FIG. 5 shows a configuration of a portion in the vicinity of an inner track in a recording region of the optical disk. In the inner area with respect to the data region 101 used for recording/reproduction, the inner dummy tracks 105 including two tracks are provided. On the inner side of the inner dummy tracks 105, the lead-in region 106 composed of pits 501 is provided. The lead-in region 106 is the read-only region in which arrangements required for recording/reproduction with respect to this disk are written in the form of pits, which include zoning, addressing of a defect managing region, addressing of a learning region, addressing of a user area, and recording/reproducing conditions. Similarly, as shown in FIG. 6, on an outer side with respect to the outermost track in the data region 101, the outer dummy tracks 107 including two tracks are provided. On the outer side of the outer dummy tracks 107, the lead-out region 108 is provided.

Using a disk having the aforementioned configuration, the magnetically separating process could be started in the following manner. Initially, tracking was performed on the grooves 202 as the recording/reproducing tracks by sample servo using a light beam spot having a power level (assumed to be of 0.5 mW in an example) low enough not to cause the magnetic layer 208 to be changed magnetically, and an address was collated. Then, the beam spot was transferred to the dummy track, and an address was detected again to confirm that the beam spot is on the dummy track. After that, the beam spot was allowed to scan over the lands by reversing the polarity of a push-pull tracking servo. Then, the power of the light beam was changed to be a predetermined level to start the magnetically separating process.

Furthermore, after the magnetically separating process was started, the pulses output for each turn of the disk from a spindle motor for driving the disk to rotate, were summed up and collated with a number n of the tracks in the data region 101. At a point in time when the number of the tracks obtained by summing up the pulses becomes n+1, the magnetically separating process was completed. As a result, the magnetically separating process could be performed, in the entire data region 101, with respect to the lands 203 positioned on both sides of each of all the recording/reproducing tracks (grooves 202) and the portion of the pit regions 103 positioned on the extensions of the lands 203 without performing a particular operation during the process.

In this embodiment, two of the inner dummy tracks 105 and two of the outer dummy tracks 107 are provided. However, the numbers of the inner and outer dummy tracks 105 and 107 may be at least one, respectively. Further, the numbers may be three or more, respectively. Particularly, when searching for positions where the magnetically separating process is started and ended, providing two or three hundreds of the dummy tracks 105 and 107, respectively, allows the magnetically separating process to be started from one of the dummy tracks 105 and 107 and ended in the other with mechanical accuracy alone without reading out track numbers, thereby being effective in realizing a device for performing a magnetic separation with a simple circuit configuration.

A recording/reproduction test was performed using the optical disk of this embodiment, in which the grooves 202 in the data region 101 were used as recording/reproducing tracks. As an optical system, a semiconductor laser having a wavelength of 650 nm and an objective lens having a NA of 0.6 were used. Tracking servo was operated by sample servo using a pair of wobble pits. A linear velocity was 3 m/second, and a light pulse having a duty ratio of 50% and a peak power of 8 mW was used to perform magnetic field modulation recording in which a magnetic field is modulated according to information to be recorded. A recording frequency was 15 MHz. As a result, in each track over the entire data region 101 from the innermost track to the outermost track, an excellent DWDD property could be obtained. Thus, it was confirmed that magnetically separating regions were formed properly in the lands 203 on both sides of each of all the groove tracks over the entire data region 101 from the innermost track to the outermost track.

<Embodiment 2>

A stamper was manufactured with a specification different from that according to Embodiment 1 and used to manufacture an optical disk for comparison using a polycarbonate substrate. The optical disk was manufactured so as to be the same in track pitch, groove width, groove depth, and the like as the disk described in Embodiment 1. Using the optical disk for comparison, the magnetically separating process was performed with respect to lands and pit regions on extensions of the lands in the same manner as in Embodiment 1, and recording was performed on grooves under the same conditions as in the test described with regard to Embodiment 1. As a result, at least with respect to a recording signal of 15 MHz, the DWDD property was extremely unstable, with a great number of dropout signals being observed. For comparison, flat portions of the pit regions were used for signal recording. In this case, an excellent DWDD signal was obtained in the flat portions without the grooves.

As a result of this, it was found that the inferiority of a DWDD operation was caused by a defect in the grooves and not by a defect in a film configuration of a magnetic layer. For further examination, a substrate of the aforementioned optical disk for comparison was observed with an electron microscope, making a comparison with the substrate described in Embodiment 1. As a result, it was found that in the substrate of the optical disk for comparison, the slopes of the grooves were highly rough.

As described above, by performing the magnetically separating process with respect to pit regions as extensions of lands as well as the lands, when a DWDD operation does not work well, it can be determined promptly whether the inferiority is caused by a defect in a magnetic layer or a defect in the shape of grooves, thereby allowing smooth treatment of the inferiority.

In Embodiments 1 and 2, the disks had an outer diameter of 50.8 mm. However, the present invention neither requires a limit nor is limited in the size of a disk. Further, the disk is not limited to 11 mm in the diameter of a central hole, and the present invention is applicable to disks with central holes of any size. Further, in Embodiments 1 and 2, a polycarbonate substrate of 0.6 mm in thickness was used as the substrate. However, the present invention is applicable to disks with substrates of any thickness, for example, 0.5 mm, 0.6 mm, 1.2 mm, or the like. A material of the substrate also is not limited to polycarbonate. The present invention is applicable to disks with substrates of any materials, on which pits and grooves are formed by emboss processing, such as other plastic materials and a glass substrate to which photopolymer is applied.

Furthermore, in Embodiments 1 and 2, a silicon nitride thin film was used as the first and second dielectric layers. However, the present invention is applicable to the cases of using other materials such as transparent dielectric materials including AlN, $SiO_2$, SiO, ZnS, and MgF, or a composite material of these compounds.

Moreover, in Embodiments 1 and 2, the magnetic layer was composed of four layers that were the domain wall displacement layer, the control layer, the switching layer and the recording layer. The control layer was provided for adjusting an exchange coupling force between the recording layer and the domain wall displacement layer. The exchange coupling force depends on a film-deposition device and film-deposition conditions, and thus the control layer is not necessarily required. Further, the domain wall displacement layer should meet at least the following two requirements: a domain wall driving force due to a temperature gradient is large; and a Kerr rotation angle is large. In order for the domain wall displacement layer to meet these requirements, it also is effective in applying the present invention that the domain wall displacement layer is composed of some of the layers.

In addition, in Embodiments 1 and 2, the disk was divided into 26 zones in the radial direction. However, the present invention is applicable regardless of the number of the zones. Further, Embodiments 1 and 2 employed a configuration in which each track was divided into 1,280 segments, and 80 segments were used to define one set of addresses. However, the present invention is not limited to these numbers of the segments.

Furthermore, in Embodiments 1 and 2, only the first wobble pit, the second wobble pit, and the address pit were provided in each of the pit regions. However, in the present invention, it is only required that the interval at which the lands are interrupted by the pit regions be not more than 20 µm, desirably, not more than 7 µm. As long as the interval falls within this range, it also is possible to include a clock pit or another type of wobble pit in addition to the aforementioned pits.

Moreover, in Embodiments 1 and 2, one sector is composed of 80 segments arranged continuously in the tangential direction, and an address number represented by a track number and a sector number is defined by using combinations of the presence or absence of the address pit in 80 positions corresponding to the address pits in each sector. This configuration is disclosed as one embodiment for realizing the interval at which the lands are interrupted of not more than 20 µm, desirably, not more than 7 µm. However, the present invention is not limited thereto.

In addition, in Embodiments 1 and 2, the grooves have a 0.44 µm width of half maximum, and the lands have a 0.1 µm width of half maximum. The grooves have a depth of 30 to 60 nm, and each of the slopes of the grooves has an inclination angle of 50 to 55 degrees. However, the present invention is not limited to these values. The present invention is effective with respect to all configurations in which tracks are magnetically separated by allowing a light beam to scan, and a DWDD operation is performed on recording/reproducing tracks.

Furthermore, in Embodiments 1 and 2, the magnetically separating regions were formed using the laser having a wavelength of 405 nm and the objective lens having a NA of 0.85. However, the present invention is not limited thereto, and a red laser or an ultraviolet laser may be used. However, it is necessary to adapt the width of the lands to the diameter of a converged beam spot.

As described above, according to the present invention, the following feature can be achieved in a DWDD (domain wall displacement detection) type optical disk. That is, recording/reproducing tracks are composed of grooves, and thus a narrower track pitch can be obtained while a sufficient width of the grooves is maintained. Further, with respect to both sides of all the recording/reproducing tracks in the entire region extending from an innermost track to an outermost track, the magnetically separating process can be performed. Thus, the invention realizes an optical disk that achieves high-density recording and secures an excellent DWDD operation.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk, comprising:
   a disk-shaped substrate with pits and grooves formed by emboss processing, in which a predetermined region ranging in a radial direction is used as a data region for recording/reproducing data; and
   at least a first dielectric layer, a magnetic layer, and a second dielectric layer that are formed on the substrate,
   wherein the data region includes a plurality of recording/reproducing tracks ranging from an innermost track to an outermost track, and is divided into a plurality of segments in a tangential direction, each segment including a pit region and a groove region; the pit region is provided with at least a pair of wobble pits to be used for sample servo; the groove region is provided with the recording/reproducing track;

the recording/reproducing tracks are composed of the grooves;

magnetic anisotropy of the magnetic layer positioned on each of lands between the respective recording/reproducing tracks is reduced to a level lower than that of magnetic anisotropy of the magnetic layers positioned on the grooves, so that the recording/reproducing tracks are magnetically separated; and at least one inner dummy track that is not used for data recording/reproduction is provided on the inner side of the innermost recording/reproducing track, and at least one outer dummy track that is not used for data recording/reproduction is provided on the outer side of the outermost recording/reproducing track.

2. An optical disk, comprising:

a disk-shaped substrate with pits and grooves formed by emboss processing, in which a predetermined region ranging in a radial direction is used as a data region for recording/reproducing data; and at least a first dielectric layer, a magnetic layer, and a second dielectric layer that are formed on the substrate, wherein the data region includes a plurality of recording/reproducing tracks ranging from an innermost track to an outermost track, and is divided into a plurality of segments in a tangential direction, each segment including a pit region and a groove region; the pit region is provided with at least a pair of wobble pits to be used for sample servo; the groove region is provided with the recording/reproducing track;

the recording/reproducing tracks are composed of the grooves;

magnetic anisotropy of the magnetic layer positioned on each of lands between the respective recording/reproducing tracks is reduced to a level lower than that of magnetic anisotropy of the magnetic layers positioned on the grooves, so that the recording/reproducing tracks are magnetically separated, and magnetic anisotropy of the magnetic layers positioned on a land portion on the inner side of the innermost recording/reproducing track and a land portion on the outer side of the outermost recording/reproducing track, respectively, is reduced to a level lower than that of magnetic anisotropy of the magnetic layers positioned on the recording/reproducing tracks, so that magnetic separation is achieved on the inner side of the innermost track and the outer side of the outermost track.

3. An optical disk, comprising:

a disk-shaped substrate with pits and grooves formed by emboss processing, in which a predetermined region ranging in a radial direction is used as a data region for recording/reproducing data; and at least a first dielectric layer, a magnetic layer, and a second dielectric layer that are formed on the substrate, wherein the data region includes a plurality of recording/reproducing tracks ranging from an innermost track to an outermost track, and is divided into a plurality of segments in a tangential direction, each segment including a pit region and a groove region; the pit region is provided with at least a pair of wobble pits to be used for sample servo; the groove region is provided with the recording/reproducing track;

the recording/reproducing tracks are composed of the grooves;

magnetic anisotropy of the magnetic layer positioned on each of lands between the respective recording/reproducing tracks is reduced to a level lower than that of magnetic anisotropy of the magnetic layers positioned on the grooves, so that the recording/reproducing tracks are magnetically separated; and also in the pit region, magnetic anisotropy of the magnetic layer positioned on an extension of the land is reduced to a level lower than that of magnetic anisotropy of the magnetic layer positioned on an extension of the groove.

4. An optical disk, comprising:

a disk-shaped substrate with pits and grooves formed by emboss processing, in which a predetermined region ranging in a radial direction is used as a data region for recording/reproducing data; and at least a first dielectric layer, a magnetic layer, and a second dielectric layer that are formed on the substrate, wherein the data region includes a plurality of recording/reproducing tracks ranging from an innermost track to an outermost track, and is divided into a plurality of segments in a tangential direction, each segment including a pit region and a groove region; the pit region is provided with at least a pair of wobble pits to be used for sample servo; the groove region is provided with the recording/reproducing track;

the recording/reproducing tracks are composed of the grooves;

magnetic anisotropy of the magnetic layer positioned on each of lands between the respective recording/reproducing tracks is reduced to a level lower than that of magnetic anisotropy of the magnetic layers positioned on the grooves, so that the recording/reproducing tracks are magnetically separated; and the grooves are composed of a discontinuous series of grooves in the form of a spiral that is interrupted in the pit regions at an interval of not more than 7 $\mu$m.

5. The optical disk according to claim 1, wherein the magnetic layer includes at least a domain wall displacement layer, a switching layer, and a recording layer that are formed in this order;

the switching layer has a Curie point lower than those of the domain wall displacement layer and the recording layer; and in a region having a temperature higher than the Curie point of the switching layer, a domain wall transferred to the domain wall displacement layer shifts toward a high-temperature portion.

6. The optical disk according to claim 1, wherein a track pitch is not more than 0.6 pm.

7. A method of magnetically separating the recording/reproducing tracks when providing the optical disk according to claim 1, wherein a light beam converged to a degree higher than that of a light beam to be used for recording/reproduction is allowed to scan over the lands that correspond to a portion between the recording/reproducing tracks, so that the magnetic anisotropy of the magnetic films positioned on the lands or both of the lands and the extensions of the lands is reduced to a level lower than that of the magnetic anisotropy of the magnetic films positioned on the grooves.

8. The optical disk according to claim 2, wherein the magnetic layer includes at least a domain wall displacement layer, a switching layer, and a recording layer that are formed in this order;

the switching layer has a Curie point lower than those of the domain wall displacement layer and the recording layer; and in a region having a temperature higher than the Curie point of the switching layer, a domain wall transferred to the domain wall displacement layer shifts toward a high-temperature portion.

9. The optical disk according to claim 3, wherein the magnetic layer includes at least a domain wall displacement layer, a switching layer, and a recording layer that are formed in this order;

the switching layer has a Curie point lower than those of the domain wall displacement layer and the recording layer; and in a region having a temperature higher than the Curie point of the switching layer, a domain wall transferred to the domain wall displacement layer shifts toward a high-temperature portion.

10. The optical disk according to claim 4, wherein the magnetic layer includes at least a domain wall displacement layer, a switching layer, and a recording layer that are formed in this order;

the switching layer has a Curie point lower than those of the domain wall displacement layer and the recording layer; and in a region having a temperature higher than the Curie point of the switching layer, a domain wall transferred to the domain wall displacement layer shifts toward a high-temperature portion.

11. The optical disk according to claim 2, wherein a track pitch is not more than 0.6 µm.

12. The optical disk according to claim 3, wherein a track pitch is not more than 0.6 µm.

13. The optical disk according to claim 4, wherein a track pitch is not more than 0.6 µm.

14. A method of magnetically separating the recording/reproducing tracks when providing the optical disk according to claim 2, wherein a light beam converged to a degree higher than that of a light beam to be used for recording/reproduction is allowed to scan over the lands that correspond to a portion between the recording/reproducing tracks, so that the magnetic anisotropy of the magnetic films positioned on the lands or both of the lands and the extensions of the lands is reduced to a level lower than that of the magnetic anisotropy of the magnetic films positioned on the grooves.

15. A method of magnetically separating the recording/reproducing tracks when providing the optical disk according to claim 3, wherein a light beam converged to a degree higher than that of a light beam to be used for recording/reproduction is allowed to scan over the lands that correspond to a portion between the recording/reproducing tracks, so that the magnetic anisotropy of the magnetic films positioned on the lands or both of the lands and the extensions of the lands is reduced to a level lower than that of the magnetic anisotropy of the magnetic films positioned on the grooves.

16. A method of magnetically separating the recording/reproducing tracks when providing the optical disk according to claim 4, wherein a light beam converged to a degree higher than that of a light beam to be used for recording/reproduction is allowed to scan over the lands that correspond to a portion between the recording/reproducing tracks, so that the magnetic anisotropy of the magnetic films positioned on the lands or both of the lands and the extensions of the lands is reduced to a level lower than that of the magnetic anisotropy of the magnetic films positioned on the grooves.

17. An optical disk, comprising:

a disk-shaped substrate, in which a predetermined region ranging in a radial direction is used as a data region for recording/reproducing data; and at least a first dielectric layer, a magnetic layer, and a second dielectric layer that are formed on the substrate, wherein the data region includes a plurality of recording/reproducing tracks ranging from an innermost track to an outermost track, and is divided into a plurality of segments in a tangential direction;

magnetic anisotropy of the magnetic layer positioned between the respective recording/reproducing tracks is reduced to a level lower than that of magnetic anisotropy of the magnetic layers positioned on the recording/reproducing tracks, so that the recording/reproducing tracks are magnetically separated;

at least one inner dummy track that is not used for data recording/reproduction is provided on the inner side of the innermost recording/reproducing track, and at least one outer dummy track that is not used for data recording/reproduction is provided on the outer side of the outermost recording/reproducing track; and magnetic anisotropy of the magnetic layer positioned between the inner dummy track and the innermost recording/reproducing track, and between the outer dummy track and the outermost recoding/reproducing track is reduced to a level lower than that of magnetic anisotropy of the magnetic layers positioned on the recording/reproducing tracks, so that the innermost/outermost recording/reproducing tracks are magnetically separated.

18. An optical disk, comprising;

a disk-shaped substrate, in which a predetermined region ranging in a radial direction is used as a data region for recording/reproducing data; and at least a first dielectric layer, a magnetic layer, and a second dielectric layer that are formed on the substrate, wherein the data region includes a plurality of recording/reproducing tracks ranging from an innermost track to an outermost track;

magnetic anisotropy of the magnetic layer positioned between the respective recording/reproducing tracks is reduced to a level lower than that of magnetic anisotropy of the magnetic layers positioned on the recording/reproducing tracks, so that the recording/reproducing tracks are magnetically separated;

at least one inner dummy track that is not used for data recording/reproduction is provided on the inner side of the innermost recording/reproducing track, and at least one outer dummy track that is not used for data recording/reproduction is provided on the outer side of the outermost recording/reproducing track; and magnetic anisotropy of the magnetic layer positioned between the inner dummy track and the innermost recording/reproducing track, and between the outer dummy track and the outermost recording/reproducing track is reduced to a level lower than that of magnetic anisotropy of the magnetic layers positioned on the recording/reproducing tracks, so that the innermost/outmost recording/reproducing tracks are magnetically separated.

* * * * *